United States Patent [19]

Fisco

[11] 4,275,982
[45] Jun. 30, 1981

[54] APPARATUS FOR MOVING MERCHANDISE GONDOLAS

[76] Inventor: Marshall Fisco, 1154 Coleman Rd., Cheshire, Conn. 06410

[21] Appl. No.: 45,180

[22] Filed: Jun. 4, 1979

[51] Int. Cl.³ ............................................... B60P 3/00
[52] U.S. Cl. .................................... 414/459; 414/460
[58] Field of Search ............. 414/458, 459, 460, 461; 280/43.14, 43.2, 43.21, 43.22, 43.24

[56] References Cited

U.S. PATENT DOCUMENTS

| | | | |
|---|---|---|---|
| 255,991 | 4/1882 | Hoopes | 280/43.21 X |
| 999,123 | 7/1911 | Pennington | 280/43.2 |
| 2,508,661 | 5/1950 | Campbell | 414/458 |
| 2,706,057 | 4/1955 | Belding | 414/459 |
| 2,937,879 | 5/1960 | Lion | 280/43.21 |
| 3,195,859 | 7/1965 | Jackson et al. | 280/43.21 X |
| 3,250,513 | 5/1966 | Fenner et al. | 414/458 X |
| 3,381,833 | 5/1968 | Gordon | 414/459 |
| 3,744,652 | 7/1973 | Rieschel | 414/459 |
| 3,768,676 | 10/1973 | Spitzer | 414/459 |
| 4,194,866 | 3/1980 | Fritschi et al. | 414/459 |

Primary Examiner—James L. Rowland
Attorney, Agent, or Firm—McCormick, Paulding & Huber

[57] ABSTRACT

Apparatus for moving merchandise gondolas comprises a collapsible rolling scaffold frame of walk-through type and an adjustable carrying attachment secured to the scaffold frame and adapted for lifting and carrying a merchandise display gondola. A gondola engaged by the carrying attachment may be raised to or lowered from carrying position by manipulating adjustment screws associated with the scaffold casters or with adjustable shoring heads which support the carrying attachment.

19 Claims, 11 Drawing Figures

APPARATUS FOR MOVING MERCHANDISE GONDOLAS

BACKGROUND OF THE INVENTION

This invention relates in general to scaffolding and deals more particularly with an improved dual purpose scaffold/straddle truck apparatus particularly adapted for moving merchandise display gondolas and the like. Effective retail merchandising requires that merchandise display gondolas located in store aisles be periodically moved to alter store traffic patterns, accommodate new merchandise displays, and generally stimulate customer interest. Most stores do not have the special handling equipment required to move a loaded merchandise gondola. Consequently, it is often necessary to dismantle a display and to move the merchandise and the gondola separately to a new location where the display is reassembled on the gondola. Most stores also have need for some type of rolling scaffold to be used in routine building maintenance, such as cleaning, repairing or replacing ceiling mounted lighting fixtures and the like, and which may be conveniently stored when not in use. Accordingly, it is the general aim of the present invention to provide a dual purpose apparatus which may function both as a scaffold, for use in routine building maintenance, and a straddle truck, for lifting and carrying merchandise gondolas, and which may be readily dismantled for convenient compact storage when not in use.

SUMMARY OF THE INVENTION

In accordance with the present invention apparatus for moving a merchandise gondola or the like comprises a collapsible, walk-through rolling scaffold frame assembly and a gondola carrying attachment mounted thereon. The scaffold frame assembly includes a pair of walk-through end frames and longitudinally disposes side members releasably connected to the end frames and maintaining the end frames in transversely disposed and longitudinally spaced apart relation. Casters mounted on the end frames support the scaffold frame assembly for smooth travel along a relatively level supporting surface. The gondola carrying attachment includes a plurality of load bearing members, means for attaching at least one of said members to each of said end frames, gondola engaging means, and means for securing the gondola engaging means to the load bearing members. The apparatus also includes hoisting means for raising and lowering the gondola engaging means relative to the supporting surface and for maintaining the gondola engaging means in its raised or carrying position.

DETAILED DESCRIPTION OF PREFERRED EMBODIMENTS

Figure 1:
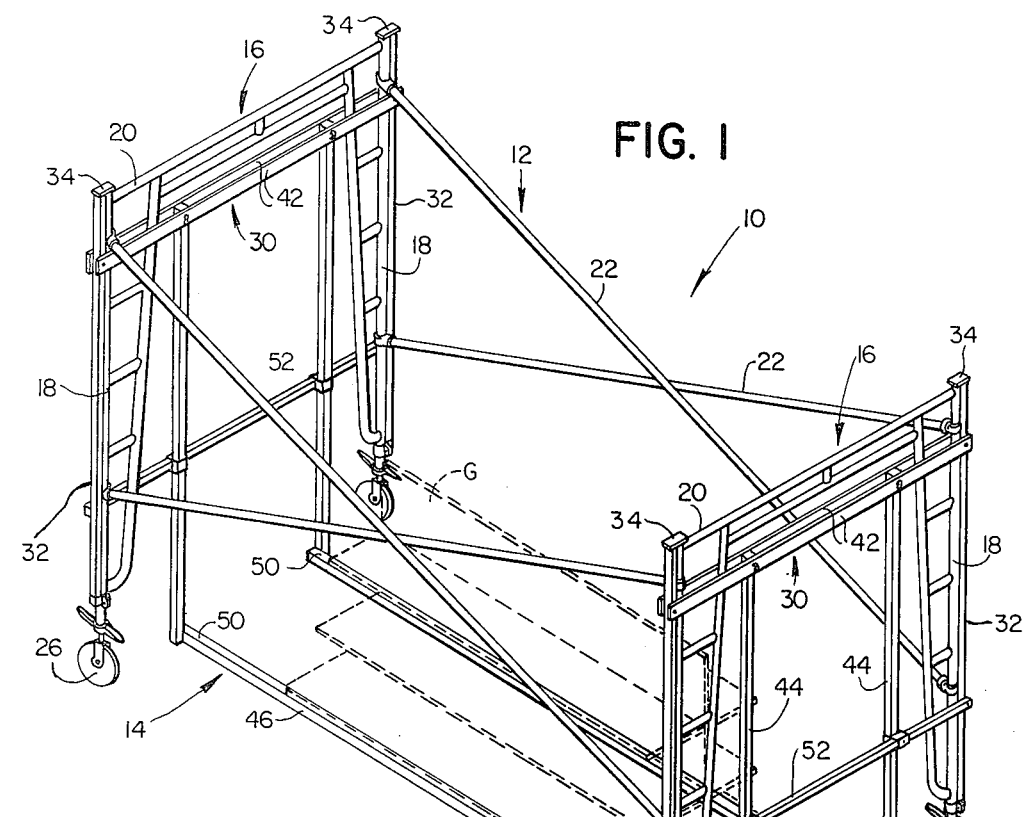
FIG. 1 is a perspective view of an apparatus embodying the present invention shown with a merchandise gondola in carrying position thereon, the gondola shown in broken lines.
Figure 2:
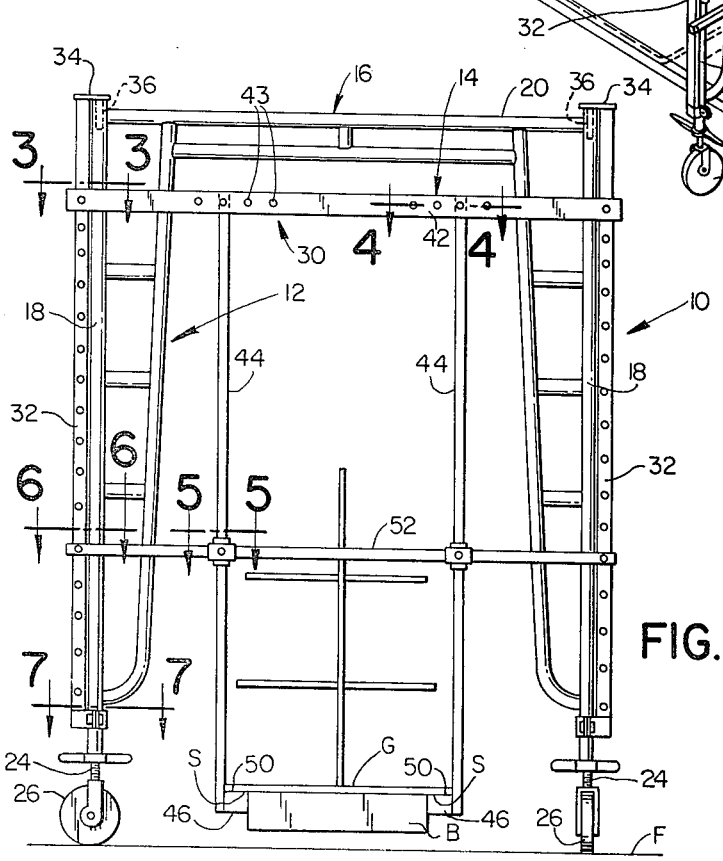
FIG. 2 is a somewhat enlarged end elevation view of the apparatus and gondola of FIG. 1.
Figure 3:
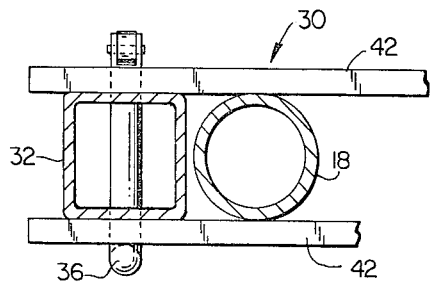
FIG. 3 is a somewhat enlarged fragmentary sectional view taken along the line 3—3 of FIG. 2.

Turning now to the drawings and referring first particularly to FIGS. 1 and 2, apparatus embodying the present invention and indicated generally by the reference numeral 10 comprises the portable rolling scaffold frame assembly of a walk-through type, indicated generally at 12, and a gondola carrying attachment releasably secured to the scaffold frame, and designated generally by the numeral 14. A merchandise gondola, shown in phantom in FIG. 1 and in full lines in FIG. 2, and designated generally by the letter G, is disposed in a carrying position on the illustrated apparatus 10 above a supporting surface or floor F.

The scaffold frame 12 is a sidewalk canopy or walk-through type which may be rolled from place to place and which is particularly adapted to provide protective canopy over a sidewalk or other passageway or a work platform for straddling objects in a work area. The frame assembly 12 generally comprises a pair of substantially identical end frames indicated generally at 16, 16. A typical end frame 16 is made from tubular metal, has an inverted, generally U-shaped configuration, and includes a pair of upright legs 18, 18 connected together in transversely spaced relation by one or more tubular cross members, such as the member 20, welded to the upper ends of the legs 18, 18 and extending horizontally therebetween. Each end frame 16 may include additional reinforcing members, substantially as shown, for desired end frame rigidity. The illustrated end frames 16, 16 are transversely disposed and connected together in longitudinally spaced apart relation by longitudinally disposed side members or cross braces 22, 22 releasably secured to the legs 18, 18 by toggle pins or other suitable quick connect fasteners. Each tubular leg 18 has an adjusting screw 24 mounted in its lower end which carries an associated swivel caster 26. A working platform (not shown) may be positioned on the scaffold frame 12, in a conventional manner, however, when the apparatus 10 is set up to move a merchandise gondola G, the working platform is not required.

The illustrated gondola carrying attachment 14 is particularly adapted for moving a merchandise gondola such as the gondola G which has a base B and a lower shelf which extends in opposite directions beyond the base and defines transversely spaced apart and downwardly facing marginal sufaces above the floor F and indicated at S, S in FIG. 2. A merchandise gondola of the type illustrated in the drawings is shown and described in U.S. Pat. No. 4,046,083 to Murdoch et al., issued Sept. 6, 1977, and for further disclosure of such a typical merchandise display gondola reference may be had to the aforesaid patent.

Considering now the illustrated carrying attachment 14 in further detail, and referring further to FIGS. 3-7, the attachment 14 includes a pair of load bearing cross members 30, 30, mounted on the end frames 16, 16. Each cross member 30 is attached to an associated end frame 16 by a pair of attaching members 32, 32 and extends in a horizontal direction and transversely of the end frame. The structure which supports the gondola G is suspended from the cross members 30, 30 and comprises a plurality of rigid vertically extending securing members or hangers 44, 44 and a pair of horizontally disposed gondola engaging carrying members 46, 46 attached to and carried by the hangers 44, 44.

Figure 7:
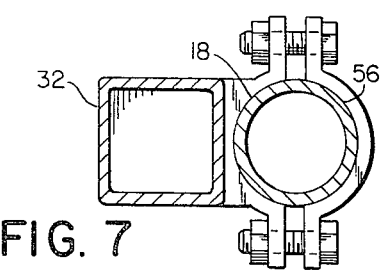
FIG. 7 is a somewhat enlarged fragmentary sectional view taken along the line 7—7 of FIG. 2.

Each attaching member 32 comprises a length of squares structural tubing which has a plate 34 welded to its upper end, as best shown in FIG. 2. A short pin 36 welded to the under side of the plate is adapted to be received in the open upper end of a tubular leg 18 to support the member 32 to depend from the upper end of the leg and in adjacent parallel relation to it, substantially as shown in FIG. 2. A swivel clamp 38 is welded or otherwise secured to the lower end of each attaching member 32 clampingly engages the lower end portion of an associated leg 18 to maintain the attaching member in fixed position relative to the leg, as best shown in FIG. 7. A vertically spaced apart series of pin receiving holes 40, 40 open through opposite sides of each tubular attaching member 32, substantially as shown.

Each cross member 30 is formed by a pair of substantially identical cross beams 42, 42 made from rectangular structural tubing. A plurality of pin receiving holes 43, 43 are spaced along the length of each cross beam and extending through its opposite sides. The cross beams 42, 42 which comprise each cross member are arranged at opposite sides of an associated end frame 16 and are secured to the attaching members 32, 32 carried by the end frame. Toggle pins, such as the pin 36 shown in FIG. 3 secure the ends of the beams 42, 42 to the attaching members 32, 32 so that the beams are supported at a desired heighth above the floor F, as best shown in FIG. 1.

Figure 4:
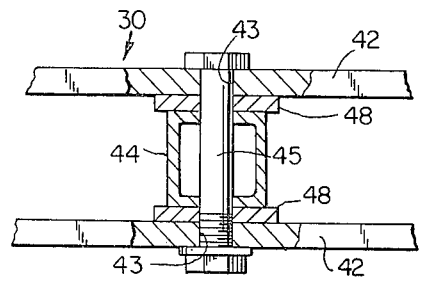
FIG. 4 is a somewhat enlarged fragmentary sectional view taken along the line 4—4 of FIG. 2.

Each cross member 30 carries a pair of hangers 44, 44. The upper end of each hanger 44 is received between and pinned or otherwise fastened to the pair of cross beams 42, 42 which comprise the cross member. A typical arrangement for fastening the upper end of a hanger 44 to an associated cross member 30 is shown in FIG. 4 and includes fastener or bolt 45. Shims such as shown at 48, 48 are or may be provided between the beams 42, 42 and the hanger 44, as necessary, to eliminate play therebetween.

The gondola carrying members 46, 46 are bolted or otherwise suitably secured to the lower ends of the hangers 44, 44 to extend in generally parallel relation between the end frames, substantially as shown in FIG. 1. The carrying members 46, 46 have upwardly facing bearing surfaces 50, 50 for engaging associated marginal surfaces S, S on the gondola G. In accordance with presently preferred practice, the members 46, 46 are made of wood to reduce risk of damage to a display gondola. The use of wooden gondola carrying members also facilitates convenient replacement of the members, if necessary.

Figure 5:
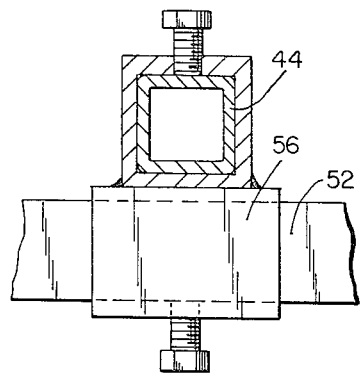
FIG. 5 is a somewhat enlarged fragmentary sectional view taken along the line 5—5 of FIG. 2.
Figure 6:
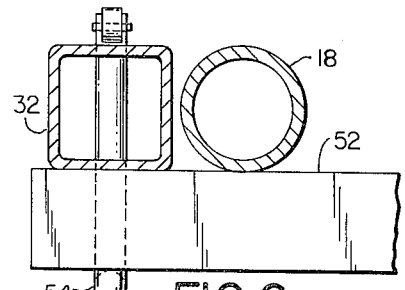
FIG. 6 is a somewhat enlarged fragmentary sectional view taken along the line 6—6 of FIG. 2.

Preferably, and as shown, adjustable cross braces 52, 52 are provided to stabilize the load bearing structure and prevent longitudinal or transverse pendular movement of the stock gondola G relative to the scaffold 12 frame during transit. Each cross brace 52 is made from square structural tubing and carries toggle pins 54, 54 at its opposite ends. The toggle pins are used to secure the ends of the cross brace 52 to an associated attaching member 32, 32, as best shown in FIG. 6. A pair of clamping collars 56, 56 mounted on each cross brace 52 and arranged for horizontal sliding movement on the cross brace and vertical sliding movement on the associated hangers are provided for clamping the hangers 44, 44 and the cross brace 52 in a selected position of adjustment as best shown in FIG. 5 to impart rigidity to the load bearing structure.

Preparatory to moving a stock gondola with the apparatus 10, scaffold frame 12 is lowered by manipulating the adjusting screws 24, 24. The carrying attachment 14 is then adjusted, as necessary, to receive the gondola G. Specifically, the transverse spacing between the hangers 44, 44 is adjusted by pinning the upper ends of the hanger 44, 44 through appropriate holes 43, 43 so that the bearing surfaces 50, 50 on the carrying members 46, 46 will be vertically aligned with the surfaces S, S on the gondola when the apparatus 10 is moved into straddling relation with the gondola. The vertical height of the cross beams 42, 42 above the floor is also adjusted, as required, so that the gondola carrying members 46, 46 will be disposed below the surfaces S, S to enable the apparatus 10 to be moved into straddling position with the gondola. One or both of the cross braces 52 may be raised and pinned in raised position to the attaching members 32, 32 which support it, to provide necessary clearance to allow the apparatus 10 to be rolled to a straddling position over the gondola.

When the apparatus 10 has been positioned to straddle the gondola the cross braces 52, 52 are vertically positioned and pinned to the respective attaching members 32, 32 at a convenient height to assure load stability. The clamping screws associated with the clamping collars 56, 56 are then tightened. Finally, the adjusting screws 24, 24 are gradually, sequentially adjusted to raise the scaffold frame 12 and the gondola while maintaining the gondola, which may have merchandise thereon, in a reasonably level condition at all times. The apparatus 10 may now be pushed to the new location selected for the gondola. When the gondola is positioned immediately above its selected location the adjusting screws 24, 24 are manipulated, in sequence, to lower the gondola while maintaining it in a substantially level position at all times. The clamping screws which secure the collar 56, 56 on one or both of the cross braces to the hangers 44, 44 are loosened and the pins 54, 54 are removed, as may be necessary, to facilitate repositioning one or both of the cross braces 52, 52 for vertical clearance relative to the gondola. The apparatus 10 may now be rolled out of straddling relation to the gondola G.

It will be apparent that the apparatus 10 may be used to support a work platform in conventional manner and without removing the carrying attachment 14. However, the carrying attachment may be readily dismantled, so that the scaffold frame 12 may serve as a work platform for straddling an object or may also be dismantled for convenient storage.

Figure 9:
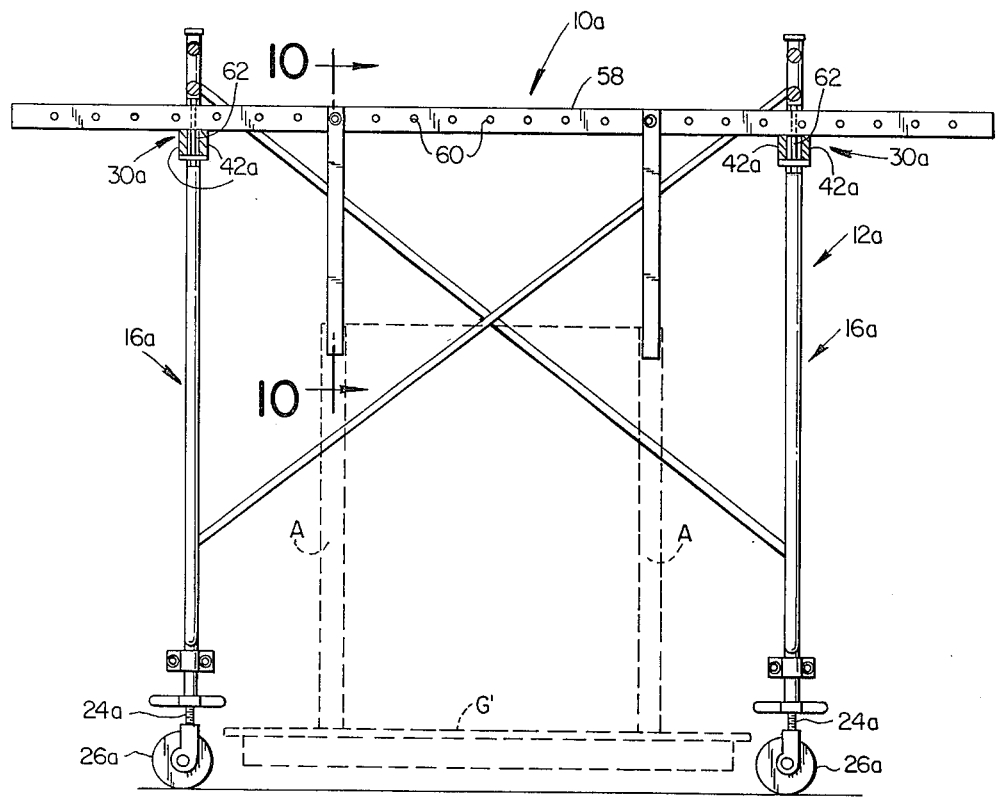
FIG. 9 is a sectional view taken generally along the line 9—9 of FIG. 8.
Figure 8:
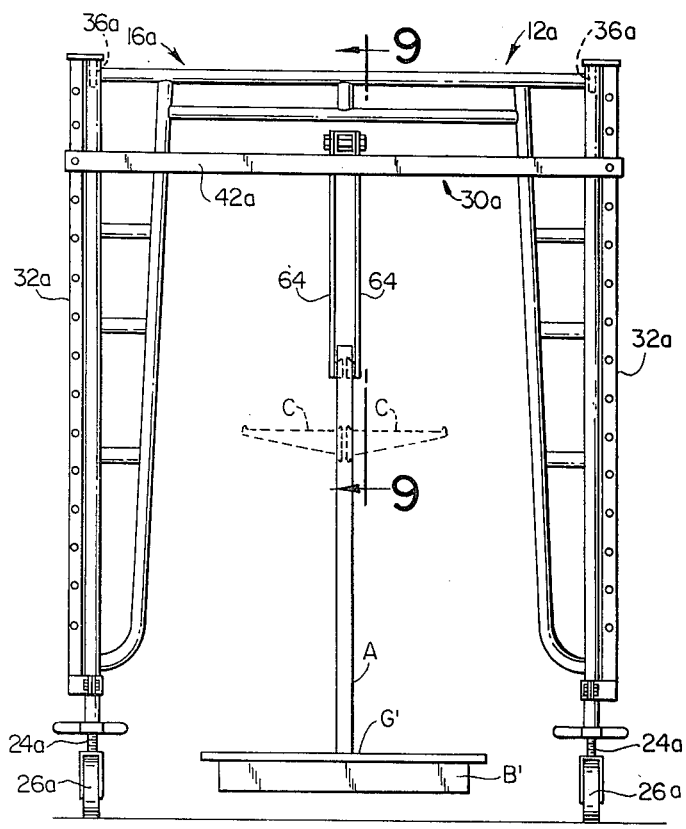
FIG. 8 is an end elevational view of another apparatus embodying the present invention shown with another merchandise gondola in carrying position thereon.
Figure 10:
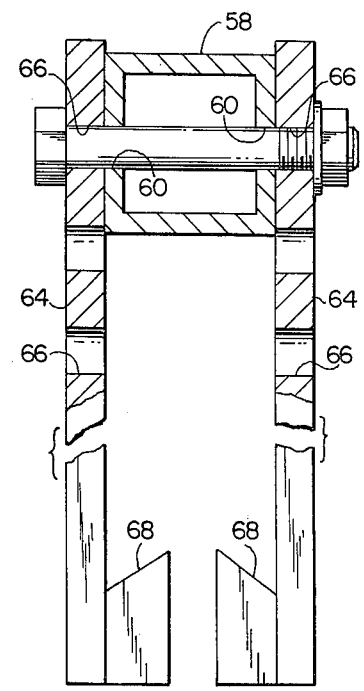
FIG. 10 is a somewhat enlarged fragmentary sectional view taken along the line 10—10 of FIG. 9.

Referring now to FIGS. 8-10 further apparatus embodying the invention is indicated generally by the reference numeral 10a. The apparatus 10a is particularly adapted to carry another type of gondola designated at G' which has a plurality of upwardly extending shelf support members indicated at A, A. The shelf support members A, A are firmly anchored to the base B' and have a plurality of generally vertically extending slots (not shown) which open transversely outwardly through opposite sides thereof for receiving hooked end portions of shelf support brackets in cantilever position thereon in a manner well known in the art. Two typical shelf brackets are shown in broken lines in FIG. 9 and indicated by the letters C, C. Parts of the apparatus 10a which are substantially identical to parts of the apparatus 10, previously described, bear the same reference numeral and a letter a suffix and will not be hereinafter described in detail.

The apparatus 10a comprises a scaffold frame 12a and has cross members 30a, 30a mounted on its end frames 16a, 16a by attaching members 32a, 32a, substantially as aforedescribed. However, the apparatus 10a differs from the apparatus 10 in that it includes a longitudinally extending beam 58 which is carried by and extends between the load bearing cross members 30a, 30a. The beam 58 is made from rectangular structural tubing and has a longitudinal series of holes 60, 60 which open transversely through its opposite sides, substantially as shown in FIG. 9. The beam 58 is preferably bolted to the cross members 30a, 30 a. As shown in FIG. 9 a bolt 62 extends downwardly through the beam 58 between each pair of cross beams 42a, 42a and through a plate disposed below the latter beams to secure the beam 58 to the cross beams. A plurality of securing members or hangers 64, 64 are carried by the beam 58 and depend therefrom. Each hanger 64 has a vertically spaced series of mounting holes 66, 66 therethrough. The hangers 64, 64 are disposed at opposite sides of and pinned or bolted to the beam 58 substantially as shown in FIG. 10. Each hanger 66 carries a gondola engaging hook 68 which is welded or otherwise secured to the lower end of the hanger as best shown in FIG. 10. The hooks 68, 68 are adapted to be received and engaged within slots in opposite sides of a shelf support member A.

Before using the apparatus 10a to move a gondola G' the scaffold frame 12a is lowered, as necessary, by manipulating the various adjusting screws 24a. The fasteners which retain the hangers 64, 64 on the beam 58 are removed. The apparatus 10a is then rolled into a straddling position with respect to the gondola G' with the beam 58 in generally vertical alignment with the various shelf support members A, A. The hooks 68, 68 on each pair of hangers 64, 64 are next engaged within a pair of opposing slots in opposite sides of a shelf support member A. Each pair of hangers 64, 64 is then pinned or bolted to the beam 58a. The holes 66, 66 provide for some degree of vertical adjustment between the carrying attachment 15a and the gondola G. Further vertical adjustment may be attained by raising or lowering the cross members 30a, 30a relative to the end frames, as necessary. If fine vertical adjustment is required to align the holes 66, 66 in the hangers with associated holes 60, 60 in the beam 58 this adjustment may be attained by manipulating the adjustment screws 24a, 24a.

After the gondola has been secured to the apparatus 10a the adjustment screws 24a, 24a are gradually manipulated, in sequence, to lift the gondola G' to a carrying position above the floor F while maintaining it in a substantially level position at all times. When the gondola is at its new location it is lowered and removed from the apparatus 10a by reversing the procedure aforedescribed.

Figure 11:
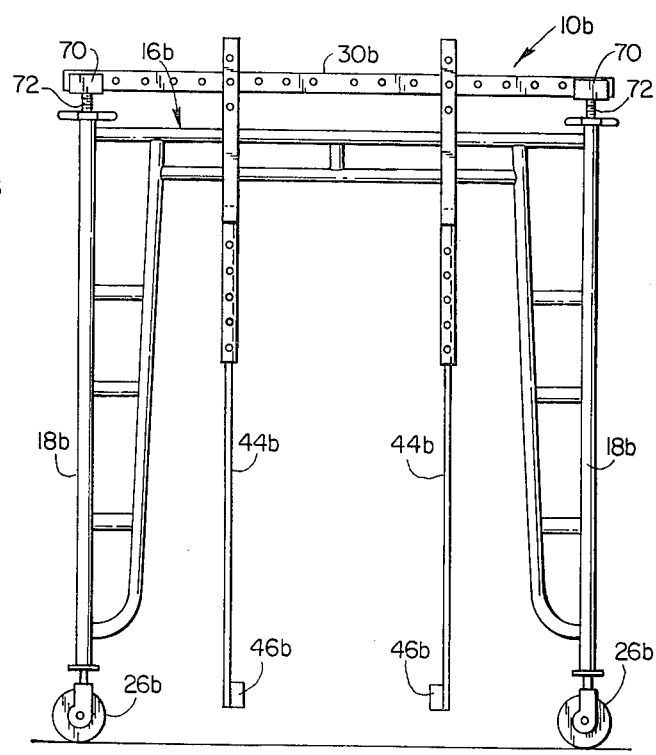
FIG. 11 is an end elevational view showing another embodiment of the invention.

In FIG. 11 there is shown still another apparatus embodying the present invention and indicated generally by the reference numeral 10b. The apparatus 10b is similar in many respects to the apparatus 10, first described, and includes a scaffold frame 12b, however, the swivel casters 26b, 26b which support the scaffold frame are not vertically adjustable. The apparatus 10b includes a pair of cross members 30b, 30b (one shown). Each cross member 30b is attached to an associated end frame 16b by a pair of adjustable shoring heads 70, 70. Each includes an adjusting screw 72 which is received within the upper end of an associated tubular leg 18b. The vertical position of each shoring head is adjusted by rotating a wing nut which is mounted on its adjusting screw 72 and bears against the upper end of an associated leg 18b. Each cross beam 30 carries a pair of securing members or hangers 44b, 44b which are of vertically adjustable length, substantially as shown. The apparatus 10b is particularly adapted to carry a merchandise gondola, such as the gondola G previously described, and includes a pair of gondola carrying members 46b, 46b which are bolted or otherwise suitably secured to the lower ends of the hangers 44b, 44b. The apparatus 10b is used in the manner of the apparatus 10, previously described, and may include one or more cross braces similar to the cross braces 52, 52 which may be clamped to the legs 18b, 18b and to the hangers 44b, 44b to stabilize the load carrying structure, however, for clarity of illustration such cross members are not shown.

I claim:

1. Apparatus for moving merchandise gondolas and the like and comprising the combination of a collapsible, walk-through, rolling scaffold frame assembly and a gondola carrying attachment releasably secured to said scaffold frame assembly, said scaffold frame assembly including a pair of walk-through end frames having an inverted generally U-shape, each of said end frames having a pair of transversely spaced apart axially elongated vertically extending legs, longitudinally disposed side members, means releasably connecting said side members to said end frames, said side members maintaining said end frames in transversely disposed and longitudinally spaced apart relation, and casters mounted on said end frames and supporting said scaffold frame assembly for travel along a supporting surface, said gondola carrying attachment including a plurality of horizontally disposed transversely extending load bearing members, attaching means for releasably securing at least one of said load bearing members to each of said end frames to extend transversely thereacross and including two pair of axially elongated attaching members and means for securing each of said attaching members to an associated one of said legs in generally adjacent axially parallel relation thereto, gondola engaging means, and securing means for connecting said gondola engaging means to said load bearing members including two pair of rigid vertically extending securing members and means for releasably attaching the securing members of each pair to an associated one of said load bearing members to depend therefrom in selected transversely spaced apart relation to each other, said apparatus having elevating means for raising and lowering said gondola engaging means relative to the supporting surface and for maintaining said gondola engaging means to its raised position.

2. Apparatus as set forth in claim 1 wherein said elevating means comprises means for raising and lowering said end frames.

3. Apparatus as set forth in claim 2 wherein said elevating means comprises a plurality of adjusting screws, each of said adjusting screws being connected between one of said casters and an associated one of said end frames.

4. Apparatus as set forth in any one of claims 1 through 3 wherein each of said load bearing members comprises a beam.

5. Apparatus as set forth in claim 4 wherein each of said end frames has a pair of transversely spaced apart and vertically extending tubular legs and said attaching means includes means for securing each attaching member in downwardly bearing relation to the upper end of an associated one of said legs.

6. Apparatus as set forth in claim 1 wherein the gondola has a plurality of upwardly extending shelf support members having apertures therein and said gondola engaging means comprises hooks carried by said securing means and engageable with said shelf support members within said slots.

7. Apparatus as set forth in claim 1 wherein the gondola has transversely spaced apart and downwardly facing marginal surfaces spaced above the surface upon which it is supported and wherein gondola engaging means comprises a pair of horizontally extending gondola engaging members having upwardly facing longitudinally extending bearing surfaces for positioning below said downwardly facing marginal surfaces and movable upwardly into engagement with said marginal surfaces by said elevating means.

8. Apparatus as set forth in claim 1 including load stabilizing means connected to said securing members and said attaching members in vertically spaced relation to said beams for generally restraining said securing members against transverse movement relative to said end frames.

9. Apparatus as set forth in claim 8 wherein said stabilizing means comprises at least one horizontally disposed cross brace releasably secured to said attaching members and said securing members.

10. Apparatus as set forth in claim 1 wherein said securing members are of adjustable length.

11. Apparatus as set forth in claim 1 wherein said means for securing each of said attaching members comprises a plate secured to the upper end of each one of said attaching members and bearing on the upper end of an associated one of said legs.

12. Apparatus as set forth in claim 11 wherein said legs comprises hollow tubular legs and said means for securing each of said attaching members comprises a pin depending from the lower surface of each said plate and received with the upper end of an associated one of said legs.

13. Apparatus as set forth in claim 11 wherein said means for securing each of said attaching members comprises a clamping member secured to a lower end portion of each one of said attaching members and clampingly engaging an associated one of said legs.

14. Apparatus as set forth in any one of claims 1, 11, 12 and 13 wherein each of said attaching members has a series of vertically spaced apart pin receiving holes therein and said attaching means includes a plurality of pins, each of said pins received in a selected one of said holes in an associated one of said attaching members and securing said load bearing members to said attaching members.

15. Apparatus for moving merchandise gondolas and the like and comprising a collapsible, walk-through, rolling scaffold frame assembly and a gondola carrying attachment releasably secured to said scaffold frame assembly, said scaffold frame assembly including a pair of walk-through end frames having an inverted generally U-shape, each of said end frames having a pair of transversely spaced apart axially elongated vertically extending legs, longitudinally disposed side members, means releasably connecting said side members to said end frames, said side members maintaining said end frames in transversely disposed and longitudinally spaced apart relation, and casters mounted on said end frames and supporting said scaffold frame assembly for travel along a supporting surface, said gondola carrying attachment including a plurality of horizontally disposed transversely extending cross beams, attaching means for releasably retaining at least one of said beams on each of said end frames to extend transversely thereacross and including a plurality of attaching members and means releasably securing each of said attaching members to an associated one of said legs in direct axially downwardly bearing relation thereto, gondola engaging means, and securing means for connecting said gondola engaging means to said cross beams including two pair of rigid vertically extending securing members and means for releasably retaining the securing members of each pair on said cross beams, said apparatus having elevating means for raising and lowering said gondola engaging means relative to the supporting surface and for maintaining said gondola engaging means in its raised position.

16. Apparatus as set forth in claim 15 wherein said attaching members comprise shoring heads mounted on said end frames at the upper ends of said legs.

17. Apparatus as set forth in claim 16 wherein said shoring heads are vertically adjustable and comprise said means for raising and lowering said gondola engaging means.

18. Apparatus as set forth in claim 15 wherein said securing means includes a longitudinally extending beam supported on said cross beams and extending therebetween and said two pair of securing members are releasably attached to said lontiduinally extending beam in longitudinally spaced apart relation to each other.

19. Apparatus for moving merchandise gondolas and the like and comprising the combination of a collapsible, walk-through, rolling scaffold frame assembly and a gondola carrying attachment releasably secured to said scaffold frame assembly, said scaffold frame assembly including a pair of walk-through end frames, each of said end frames having an inverted generally U-shape and including a pair of transversely spaced apart axially elongated vertically extending tubular legs, longitudinally disposed side members, means releasably connecting said side members to said end frames, said side members maintaining said end frames in transversely disposed and longitudinally spaced apart relation, a plurality of casters, each of said casters mounted on an associated one of said legs, said casters supporting said scaffold frame assembly for travel along a supporting surface, and means for raising and lowering said end frames including a plurality of adjusting screws, each of said adjusting screws having an end portion received within an associated one of said tubular legs and carrying an associated one of said casters, said gondola carrying attachment including a pair of axially elongated attaching members, each of said attaching members having a plate secured to its upper end and bearing downwardly against the upper end of an associated one of said legs and a pin carried by said plate and extending into the upper end of said associated leg, each of said attaching members having a clamping member secured to a lower end portion thereof and clampingly engaged with an associated one of said legs, said pin and said clamping member on each attaching member cooperating to releasably retain said attaching member in generally adjacent axially parallel relation to an associated on of said legs, each of said attaching members having a column of vertically spaced apart pin receiving holes therethrough, a pair of horizontally disposed transversely extending load bearing members, each of said load bearing members including two cross beams disposed adjacent longitudinally opposite sides of an associated one of said end frames and pinned at opposite ends to associated attaching members through selected holes in said attaching members, said beams having rows of horizontally spaced apart pin receiving holes therethrough, two pair of rigid vertically extending securing members, said securing members in each pair being pinned to an associated one of said load bearing members through selected pin receiving openings in said beams and depending from said associated load bearing member in horizontally spaced apart relation to each other, and gondola engaging means carried by said securing members.

* * * * *